United States Patent [19]

Young

[11] Patent Number: 5,612,950

[45] Date of Patent: Mar. 18, 1997

[54] MANAGING COMMUNICATION ON AN UNSTABLE ERROR-PRONE CHANNEL

[75] Inventor: Charles D. Young, Richardson, Tex.

[73] Assignee: Rockwell International Corporation, Seal Beach, Calif.

[21] Appl. No.: 68,370

[22] Filed: May 27, 1993

[51] Int. Cl.$^6$ .......................................................... H04L 5/14
[52] U.S. Cl. .......................... 370/276; 370/346; 370/349; 370/455
[58] Field of Search ............................... 370/85.2, 85.6, 370/24, 94.1, 94.2, 60, 58.1–58.3, 95.2, 95.1, 85.7; 340/825.08, 825.51, 825.5; 371/32, 33

[56] References Cited

U.S. PATENT DOCUMENTS

| | | | |
|---|---|---|---|
| 4,829,297 | 5/1989 | Ilg et al. | 370/85.8 |
| 4,860,000 | 8/1989 | Kobayashi | 370/85.2 |
| 4,905,229 | 2/1990 | Kato | 370/85.7 |
| 4,905,234 | 2/1990 | Childress et al. | 370/24 |
| 5,084,877 | 1/1992 | Natravali et al. | 370/94.1 |
| 5,267,244 | 11/1993 | Messerschmitt et al. | 370/95.3 |

*Primary Examiner*—Benedict V. Safourek
*Assistant Examiner*—Ajit Patel
*Attorney, Agent, or Firm*—V. Lawrence Sewell; Kyle Eppele; G. A. Montanye

[57] ABSTRACT

A method of managing communication on an unstable error-prone channel is disclosed, having particular applicability to transceiver nodes in a high frequency radio network. The method achieves highly reliable, efficient communication through the exchange of headers within control frames in accordance with a selected suite of protocols. An orderly link establishment is achieved by the exchange of headers indicating specific link establishment states of the nodes. One node having message data to transmit to another sends a herald header, and if the data is to be accepted by the other node, it responds with a herald acknowledgment header. The herald conveys parameters of the proposed transmission to the receiving node, permitting the parameters to be varied by the transmitting node for changing channel conditions. The issuance of a herald acknowledgment depends on message priorities exchanged by the nodes, so that higher priority messages can preempt lower priority ones. The issuance of a data transfer header including a data acknowledgment informs a transmitting node of data frames that require retransmission.

15 Claims, 11 Drawing Sheets

| NODE 1 LINK STATE | | CONTROL/DATA FRAME | | NODE 2 LINK STATE |
|---|---|---|---|---|
| IDLE | 30 | (BEFORE LINK ESTABLISHMENT) | 30 | IDLE |
| AWAITING ACK | > | #a1 ~~LINK EST: AWAITING ACK~~ | > | |
| | | | | (RETRANSMISSION TIMEOUT) |
| AWAITING ACK | > | #a2 LINK EST: AWAITING ACK | > | |
| | < | #a3 LINK EST: GOT ACK | < | GOT ACK |
| LINK UP | > | #a4 ~~LINK EST: LINK UP~~ | > | |
| | < | #a5 LINK EST: GOT ACK | < | GOT ACK |
| LINK UP | > | #a6 LINK EST: LINK UP | > | |
| | < | #a7 LINK EST: LINK UP | < | LINK UP |

FIG. 3

| NODE 1 STATE VARIABLES | | | CONTROL/DATA FRAME | | NODE 2 STATE VARIABLES | |
|---|---|---|---|---|---|---|
| LINK STATE | TX STATE | | | | LINK STATE | RX STATE |
| AWAITING ACK | — | > | #b1 LINK EST: AWAITING ACK & MESSAGE MANAGEMENT | > | | |
| | | < | #b2 LINK EST: GOT ACK & MESSAGE MANAGEMENT | < | GOT ACK | AWAITING HERALD |
| LINK UP | AWAITING HERALD ACK | > | #b3 DATA TRANS: HERALD & LINK EST: LINK UP | > | | |
| | | < | #b4 DATA TRANS: HERALD ACK & LINK EST: LINK UP | < | LINK UP | AWAITING DATA |
| LINK UP | TXING DATA | > | #b5 DATA FRAME 1 | > | | |
| LINK UP | TXING DATA | > | #b6 DATA FRAME 2 | > | | |

FIG. 4

| NODE 1 STATE VARIABLES | | | CONTROL/DATA FRAME | | NODE 2 STATE VARIABLES | |
|---|---|---|---|---|---|---|
| LINK STATE | RX STATE | | | | LINK STATE | TX STATE |
| AWAITING ACK | — — | > | #c1 LINK EST: AWAITING ACK & MESSAGE MANAGEMENT | > | | |
| | | < | #c2 LINK EST: GOT ACK & MESSAGE MANAGEMENT | < | GOT ACK | |
| LINK UP | AWAITING HERALD | > | #c3 ~~LINK EST: LINK UP~~ | > | | |
| | | < | #c4 ~~LINK EST: GOT ACK~~ (TIMEOUT) | < | GOT ACK | |
| | | < | #c5 LINK EST: GOT ACK | < | GOT ACK | |
| LINK UP | AWAITING HERALD | > | #c6 LINK EST: LINK UP | > | | |
| | | < | #c7 DATA TRANS: HERALD & LINK EST: LINK UP | < | LINK UP | AWAITING HERALD ACK |
| LINK UP | AWAITING DATA | > | #c8 DATA TRANS: HERALD ACK | > | | |
| | | < | DATA FRAME 1 | < | LINK UP | TXING DATA |
| | | < | DATA FRAME 2 | < | LINK UP | TXING DATA |

FIG. 5

| NODE 1 RECEIVE STATE | | CONTROL/DATA FRAME | | NODE 2 TRANSMIT STATE |
|---|---|---|---|---|
| | < | #d1 ~~DATA FRAME n-1~~ | < | TXING DATA |
| | < | #d2 DATA FRAME n | < | AWAITING DATA ACK |
| AWAITING HERALD | > | #d3 ~~DATA TRANS: DATA ACK~~ | > | |
| | < | #d4 DATA TRANS: DATA ACK NACK | < | AWAITING DATA ACK |
| AWAITING HERALD | > | #d5 DATA TRANS: DATA ACK | > | |
| | > | #d6 DATA TRANS: HERALD | > | AWAITING HERALD ACK |
| | > | #d7 ~~DATA TRANS: HERALD ACK~~ | > | |
| AWAITING DATA | > | #d8 DATA TRANS: HERALD | > | AWAITING HERALD ACK |
| AWAITING DATA | > | #d9 DATA TRANS: HERALD ACK | > | |
| | < | DATA FRAME n-1 | < | TXING DATA |
| | < | DATA FRAME n+1 | < | TXING DATA |
| | < | DATA FRAME n+2 | < | TXING DATA |

FIG. 6

| NODE 1 STATE VARIABLES | | | CONTROL/DATA FRAME | | NODE 2 STATE VARIABLES |
|---|---|---|---|---|---|
| TX STATE | RX STATE | | | | TX STATE |
| TXING DATA | AWAITING HERALD | > | #e1 DATA n-1 | > | |
| AWAITING DATA ACK | AWAITING HERALD | > | #e2 DATA n | > | |
|  |  | < | #e3 DATA TRANS: DATA ACK & DATA TRANS: HERALD | < | AWAITING HERALD ACK |
| — | AWAITING DATA | > | #e4 ~~DATA TRANS: HERALD ACK~~ | > | |
|  |  | < | #e5 DATA TRANS: DATA ACK & DATA TRANS: HERALD | < | AWAITING HERALD ACK |
| — | AWAITING DATA | > | #e6 DATA TRANS: HERALD ACK | > | |
|  |  | < | #e7 DATA FRAME 1 | < | TXING DATA |
|  |  | < | #e8 DATA FRAME 2 | < | TXING DATA |

FIG. 7

| | NODE 1 STATE VARIABLES | | | CONTROL/DATA FRAME | | NODE 2 STATE VARIABLES | |
|---|---|---|---|---|---|---|---|
| | TX STATE | RX STATE | | | | TX STATE | RX STATE |
| | | | #f1 | DATA FRAME n−1 | < | TXING DATA | -- |
| | | | #f2 | DATA FRAME n | < | AWAITING DATA ACK | -- |
| | AWAITING HERALD ACK | AWAITING HERALD | #f3 | DATA TRANS: DATA ACK & DATA TRANS: HERALD & MESSAGE MANAGEMENT | > | | |
| | | | #f4 | DATA TRANS: HERALD & MESSAGE MANAGEMENT | < | AWAITING HERALD ACK | -- |
| | -- | AWAITING DATA | #f5 | DATA TRANS: HERALD ACK | > | | |
| | | | #f6 | DATA FRAME n+1 | < | TXING DATA | -- |
| | | | #f7 | DATA FRAME n+2 | < | TXING DATA | -- |

FIG. 8

| NODE 1 STATE VARIABLES | | | CONTROL/DATA FRAME | | NODE 2 STATE VARIABLES | |
|---|---|---|---|---|---|---|
| TX STATE | RX STATE | | | | TX STATE | RX STATE |
| AWAITING DATA ACK | -- | > | #g1 LAST DATA OF CURRENT SERIES OF DATA FRAMES OF FIRST MESSAGE | > | | |
| | AWAITING DATA | < | #g2 DATA TRANS: DATA ACK & DATA TRANS: HERALD & MESSAGE MANAGEMENT | < | AWAITING HERALD ACK | AWAITING HERALD |
| -- | | > | #g3 DATA TRANS: HERALD ACK | > | TXING DATA | |
| | | < | #g4 FIRST DATA OF SECOND, HIGHER PRIORITY MESSAGE | < | | AWAITING HERALD |
| | | < | #g5 LAST DATA OF SECOND, HIGHER PRIORITY MESSAGE | < | AWAITING DATA ACK | AWAITING HERALD |
| AWAITING HERALD ACK | -- | > | #g6 DATA TRANS: DATA ACK DATA TRANS: HERALD | > | | |
| | | < | #g7 DATA TRANS: HERALD ACK | < | -- | AWAITING DATA |
| TXING DATA | -- | > | #g8 NEXT UNSENT DATA OF FIRST MESSAGE | > | | |

FIG. 9

| NODE 1 STATE VARIABLES | | | CONTROL/DATA FRAME | | NODE 2 STATE VARIABLES | |
|---|---|---|---|---|---|---|
| LINK STATE | TX STATE | | | | LINK STATE | RX STATE |
| LINK UP | AWAITING DATA ACK | > | #h1 LAST DATA | | | |
| LINK UP | AWAITING HERALD ACK | < | #h2 DATA TRANS: DATA ACK | | LINK UP | AWAITING HERALD |
| LINK UP | AWAITING HERALD ACK | > | #h3 DATA TRANS: HERALD | | LINK UP | AWAITING HERALD |
| | | < | #h4 DATA TRANS: NULL ACK | | | |
| | | ... | | | | |
| LINK UP | AWAITING HERALD ACK | > | #h5 DATA TRANS: HERALD | | LINK UP | AWAITING HERALD |
| | | < | #h6 DATA TRANS: NULL ACK | | | |
| LINK UP | AWAITING HERALD ACK | > | #h7 DATA TRANS: HERALD | | | |
| | | < | #h8 DATA TRANS: HERALD ACK | | LINK UP | AWAITING DATA |
| LINK UP | TXING DATA | > | #h9 DATA | | | |

FIG. 10

| NODE 1 STATE VARIABLES | | | CONTROL/DATA FRAME | | | NODE 2 STATE VARIABLES | | |
|---|---|---|---|---|---|---|---|---|
| LINK STATE | TX STATE | RX STATE | | | | LINK STATE | TX STATE | RX STATE |
| LINK UP | TXING DATA | -- | > #k1 DATA n−1 > | | | | | |
| LINK UP | AWAITING DATA ACK | -- | > #k2 DATA n > | | | | | |
| IDLE | -- | -- | < #k3 DATA ACK < | | | LINK UP | -- | RX DONE |
| IDLE | -- | -- | (SHORT TIMEOUT) | | | IDLE | -- | -- |

FORMAT OF CONTROL FRAME

| # | HEADER | NAME OF FIELD | # BITS | POSSIBLE VALUES |
|---|---|---|---|---|
| r1 | FRAME | SYNC MISMATCH | 1 | 1 |
| r2 | ∥ | FRAME TYPE | 1 | 1 = CONTROL |
| r3 | REPEAT | FRAME SEQ NO. | 3 | 0 TO 7 |
| r4 | ∥ | FRAME COUNT | 3 | 0 TO 7 |
| r5 | LINK EST | LINK STATE | 2 | 0 = LINK DOWN-AWAITING ACK<br>1 = LINK DOWN-GOT ACK<br>2 = LINK UP<br>3 = DROP LINK |
| r6 | | SPARE | 1 | |
| r7 | | EXTENDED ADDRESS | 1 | 0 = 2 BYTE ADDRESSES<br>1 = 18 BYTE ADDRESSES |
| r8 | | MODE | 2 | 0 = ACK REQUIRED<br>1 = SEND NO ACK<br>2 = CIRCUIT |
| r9 | DAT XFR | ACK NACK | 2 | 0 = NULL ACK<br>1 = DATA ACK<br>2 = DATA ACK NACK<br>3 = HERALD ACK |
| r10 | | ACK BIT MAP | 256 | 1 = ERROR-FREE |
| r11 | HERALD | NUMBER OF FRAMES | 8 | # OF DATA FRAMES IN NEXT SERIES (256 MAX) |
| r12 | | DATA BYTES IN FRAME | 10 | # OF DATA BYTES IN DATA FRAME (1023 MAX) |
| r13 | | HERALD DATA GAP | 1 | 0=NO GAP 1=GAP |
| r14 | | DATA RATE FORMAT | 1 | 0=ABSOLUTE 1=RELATIVE |
| r15 | | DATA RATE | 3 | ABS:0=75 1=150...7=9600<br>REL:0= 8 1= 4 2= 2 3= 1<br>    4= 2 5= 4 6= 8 7= 16 |
| r16 | | INTERLEAVER | 1 | 0=SHORT 1=LONG |
| r17 | MSG MNG | SOURCE ID | 16 | SOURCE ID OF THE MESSAGE |
| r18 | | DESTIN ID | 16 | DESTINATION ID OF THE MSG |
| r19 | | TX MSG ID | 8 | TRANSMIT MESSAGE ID |
| r20 | | TX CONNEC ID | 8 | OSI DLS CONNECTION ID |
| r21 | | TX MESSAGE SIZE | 24 | IN BITS (16 MBITS MAX) |
| r22 | | TX NEXT BIT | 24 | NEXT BIT OF MSG TO TX |
| r23 | | TX PRIORITY | 8 | 0 = LOWEST |
| r24 | | RX NEXT BIT | 24 | NEXT BIT OF MSG TO RECEIVE |
| r25 | EXTENDED | USER ID | 14 | ID ASSIGNED TO USER |
| r26 | ∥ | FUNCTION BITS | 50 | USE DEPENDENT ON USER |
| r27 | | FRAME CRC | 32 | |
| | | TOTAL # BITS | 520 | |

*FIG. 11*

FIG. 12
FORMAT OF DATA FRAME

| # | HEADER | NAME OF FIELD | # BITS | POSSIBLE VALUES |
|---|--------|---------------|--------|-----------------|
| s1 | FRAME | SYNC MISMATCH | 1 | 1 |
| s2 | | FRAME TYPE | 1 | 0 = DATA |
| s3 | REPEAT | FRAME SEQUENCE NO. | 3 | 0 TO 7 |
| s4 | | FRAME COUNT | 3 | 0 TO 7 |
| s5 | DATA | SEQUENCE NO. | 8 | FRAME WITHIN SERIES |
| s6 | | MESSAGE BYTE OFFSET | 21 | OFFSET INTO MESSAGE |
| s7 | | SPARE | 3 | |
| s8 | | DATA BYTES | | VARIABLE MESSAGE DATA |
| s9 | | FRAME CRC | 32 | |
| | | TOTAL # BITS | | 72 + # DATA BYTES |

MANAGING COMMUNICATION ON AN UNSTABLE ERROR-PRONE CHANNEL

BACKGROUND OF THE INVENTION

1. Field of the Invention

This invention relates to a method of managing communication on an unstable error-prone channel. The invention has particular applicability to communication between transceiver nodes in high frequency (HF) radio networks.

2. Description of the Related Art

The present invention arose in the field of HF radio communications. The quality of an HF radio link is time varying. Sometimes, the quality of the link for a particular transmission frequency permits higher data rates than at other times, and sometimes transmission on that frequency is not feasible. Historically, HF radio communication has been characterized by the search for a transmission frequency which will permit acceptable link quality at a particular time, as well as uncertainty about the duration of the acceptable link.

In the last few years, there have been innovations directed to the goal of HF radio communication which is more reliable from the standpoint of an operator and which is more suitable as a link between nodes of a communication network. These innovations include protocols and methods of automatically communicating control frames, i.e., frames of control information, back and forth between HF radio nodes in a way that promotes the effective identification of suitable frequencies for transmission between the nodes and the use of new frequencies in response to changes in the link.

Even when effective methods are used to select transmission frequencies providing suitable link quality, much remains to be done in providing efficient and reliable communication over an HF link. There are problems of coordinating the communications between radio nodes, so that they enter into communication with each other in an orderly fashion and it is established which of the nodes is to transmit and which is to receive at a given time. The nodes must have a method for effectively communicating which data has been successfully transferred between them. If the methods of managing communication between the nodes can be made adaptive, efficiencies can be improved. When the nodes have a limited storage capacity, then each node must be able to control the flow of information that it receives at any time.

The present invention provides methods for addressing such issues in the particular environment of HF radio communication, which by its nature requires verification that communications have been received. The methods of the present invention are based on the conception of communicating according to certain protocols. In the framework of the ISO Network Reference Model, the hierarchial level of the protocols of the present invention is the "data link layer".

SUMMARY OF THE INVENTION

In accordance with the present invention, I have conceived a suite of protocols, and a process for exchanging control frames between communication nodes according to the protocols, in order to achieve a reliable communication link between the nodes, which is particularly applicable to high frequency radio.

My invention teaches the orderly establishment of a communication link between the nodes by assigning an idle state and three active link establishment states to each node and carrying out a process in which each node announces its state and obtains a particular response to the announcement before making a transition to the next state.

The process of my invention coordinates which of the nodes is to drive the link, that is, be responsible for retransmitting in case a transmission is not received. It accomplishes this (a) by sending control frames between the nodes, with the control frames having a message management protocol header that includes the priority of any message to be sent, (b) by sending a control frame header referred to as a "herald" from a node which proposes to send data, and (c) by obtaining an acknowledgment of the herald from the destination node, accepting the proposal, before data is transmitted. Whether a herald is acknowledged depends on the relative priorities of data to be sent between the nodes; accordingly, it is a feature of my invention that message data is sent in accordance with priorities, with data of equal priority taking turns on the link.

In a preferred embodiment of my invention, the herald includes parameters of the proposed transmission such as data rate, data frame size, and interleaver interval. Accordingly, my invention provides for flexible selection and adaptation of these parameters to the condition of the communication channel.

The use of the herald acknowledgment by the invention is an important feature. When it is issued, it accepts the transmission proposed by the herald and confirms that transmission parameters have been received. Sometimes, operating according to the method of my invention, a node responds to a herald with its own, second herald rather than a herald acknowledgment, because it has higher priority data to send; then as soon as the second herald is acknowledged, the nodes are ready for the transfer of data. This process contributes to the nodes spending a minimum amount of time in unknown or incompatible states, thereby improving efficiency.

The herald acknowledgment process additionally contributes to efficiency by confirming receipt of the transmission parameters in the herald. These parameters can be selected by the heralding node to make best use of the channel capacity, as opposed to using the same data transmission parameters for all conditions.

In accordance with the process of my invention, after the transmission of a series of data, the receiving node sends a data transfer protocol control frame header including a data acknowledgment that specifies any data that requires retransmission. If this is not received by the transmitting node, it requests the data acknowledgment by sending a data transfer header including a data acknowledgment nack indication. Thus, my invention provides systematic assurance that correct data is transferred.

Using the message management protocol and herald, and herald acknowledgment, my invention teaches a method of preempting a first message in progress by one of higher priority, and then a resuming transmission of the first message.

It is a further aspect of the present invention that it can respond to a herald, not with a herald acknowledgment but an acknowledgment that stifles the transmission of traffic to the node. It can thereby control the flow of traffic to it, preventing such traffic when it is necessary because of storage capacity or other considerations.

BRIEF DESCRIPTION OF DRAWINGS

FIG. 3 is a diagram listing the sequence of transition steps and state changes for the process of two nodes establishing which is to transmit a message.

FIG. 4 is a diagram listing the sequence of transmission steps and state changes for the process of a first node establishing a link but a second node establishing its priority to transmit first.

FIG. 5 is a diagram listing a sequence of transmission steps and state changes for the process of acknowledging data received by one node from another.

FIG. 6 is a diagram listing a sequence of transmission steps and state changes for the process of turning around a link between two nodes.

FIG. 7 is a diagram listing a sequence of transmission steps and state changes for the process wherein message priorities do not allow the link to be turned around.

FIG. 8 is a diagram listing a sequence of transmission steps and state changes for the process of interrupting traffic between two nodes with a higher priority message and then resuming the interrupted traffic.

FIG. 9 is a diagram listing a sequence of transmission steps and state changes for the process of one node controlling the traffic flow by preventing transmission to it by another node.

FIG. 10 is a diagram listing a sequence of transmission steps and state changes for the process of dropping the link between two nodes.

FIG. 11 is a listing of bit fields which embody control frames and protocols of the process of the invention.

FIG. 12 is a listing of the bit fields which embody data frames of the process of the invention.

DESCRIPTION OF THE PREFERRED EMBODIMENT

Figures 1, 2:
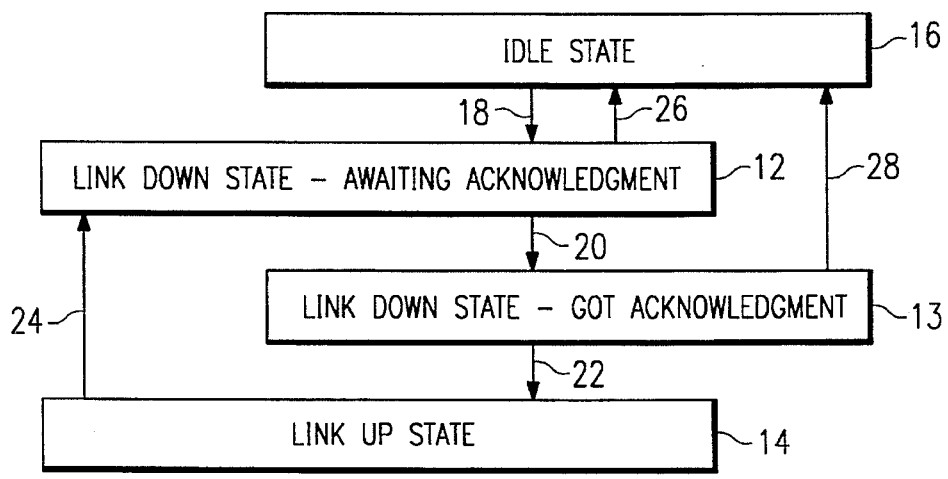
FIG. 1 is a state transition diagram for the link establishment states in the process of the invention.
FIG. 2 is a diagram listing the sequence of transmission steps and state changes for the process of two nodes establishing a communication link.

The method of the present invention is intended for use in a network of high frequency radio transceiver nodes. While this environment does shape the method of the invention, the following discussion will be directed simply to communication between two nodes. Each node recognizes message data intended for it by an address accompanying the data and can identify the node sending the data by an accompanying source address. These addresses, as well as the protocol headers on which the method of the invention are based can be embodied in a digital control frame, as described in the latter part of this application.

Special hardware is not required to implement the method of the invention. Present high frequency radio transceivers and modems are controllable by a personal computer, which can be programmed with the steps of the present method.

It will be assumed in the following discussion that some mechanism is being employed to establish satisfactory transmission frequencies for use at both ends of the link.

Link Establishment

The link establishment steps of the present invention provide an orderly transition from a link down state to a link up state, making sure that both nodes have knowledge of each other's requirements for data transfer and that one node is ready to receive, when the other starts to transmit.

The operation of link establishment is most easily understood in terms of a typical sequences of steps, which will be described below. As important background for consideration of such typical steps, the link establishment states shown in the state transition diagram of FIG. 1 will be described.

The first active link establishment state is the "link down state-awaiting acknowledgment" 12. The presence of a node in this first state indicates that the node is ready to establish a new link or reestablish a link that failed. The second state is the "link down state-got acknowledgment" 13. When a node is in this second state, it indicates that the node has received an invitation from another node to establish a link and has accepted the invitation. The third state, the "link up state" 14 indicates that the node is ready to transfer data. In addition to the above, there is an "idle state" 16.

The rules for transitions between the link establishment states are as follows:

a. A node makes a transition 18 from the idle state 16 to the link down state-awaiting acknowledgment 12, if (1) it has a message to transmit or (2) it receives a transmission addressed to it.

b. A node makes the transition 20 from the link down state-awaiting acknowledgment 12 to the link down state-got acknowledgment 13, if it has just received a transmission from a node which is in a link state other than the link up state.

c. A node makes the transition 22 from the link down state-got acknowledgment 13 to the link up state 14, if it has just received a transmission from a node which is in a state other than the link down state-awaiting acknowledgment.

d. A node makes the transition 24 from the link up state 14 to the link down state-awaiting acknowledgment 12, if (1) it has just received a transmission from a node which is in the link down state-awaiting acknowledgment 12, or (2) a time-out occurs.

e. A node makes the transition 26 back to the idle state 16 from the link down state-awaiting acknowledgment 12, if a time-out occurs.

f. A node make the transition 28 back to the idle state 16 from the link down state-got acknowledgment 13, if a time-out occurs.

The way the state transition rules work, a node may step through one link state to another upon receipt of a single transmission from another node. For example, if a node is in the idle state 16 and receives a transmission addressed to it from a node which is in the link down-awaiting acknowledgment, then the addressed node makes the transition 18 to its link down state-awaiting acknowledgment 10 and then also the transition 20 to its link down state-got acknowledgment 12.

One implication of the described link states and rules is that if a node is in the link up state 14 and receives a transmission addressed to it from a node in the link down state-awaiting acknowledgment, the addressed node makes the transition 24 to its link down state-awaiting acknowledgment 12 and then the transition 20, arriving at its link down state-got acknowledgment 13. This is entirely appropriate, since state 13 is the response state to an inquiry from state 12.

The link down state-got acknowledgment 13 is provided so that each node must transition through state 13 to avoid oscillating between states 12 and 14.

Even with the orderly link establishment protocols described, there is a risk of contention caused by two transmitters simultaneously attempting to initiate the link with each other or a third node, if such a thing is permitted by the network arrangement. The insertion of suitable random variations in the times which the nodes transmit will allow such contention to be resolved.

The ability of the nodes to detect that a channel is busy, by means of a carrier detect or receiver busy indicator, helps with the contention problem and the establishment of timeout intervals for the nodes.

FIG. 2 illustrates an interchange between two nodes to carry out link establishment according to the method of the invention. The figure shows the link state of each of two nodes labeled "node 1" and "node 2". Arrowheads 30 point in the direction of transmission between the nodes. Between the arrowheads are listed the link establishment portions of control frames used to communicate the in accordance with the link establishment protocols between the nodes. Where a control frame is lined through, it indicates that that link establishment frame was lost, not received by the intended node, or had non-correctable bit errors.

In the period before link establishment, both node 1 and 2 of FIG. 2 are in the idle state. As node 1 has a message to send to node 2, node 1 is the initiating node and enters the link down state-awaiting acknowledgment, abbreviated "awaiting ack" in the figure. Node 1 transmits a control frame a1 addressed to the responding node 2 and including a link establishment portion with an indication that the transmitting node 1 is in the link down state-awaiting acknowledgment.

Node 2 does not receive control frame a1, so it does not take any action based on that frame. When node 1 does not get an immediate response to frame a1, it does not know whether the frame was lost due to propagation or because node 2 was also trying to transmit. Thus, node 1 must wait a while. After a retransmission time-out, node 1 retransmits the same kind of control frame as frame a2. Node 1 may also lower the data rate for the transmission of frame a2 for error reduction.

Node 2 receives control frame a2 and in accordance with the state transition rules given above, node 2 enters the link down state-got acknowledgment, abbreviated "got ack" in FIG. 2. Node 2 transmits frame a3, indicating that the node is in the link down state-got acknowledgment, addressed to node 1.

When node 1 receives frame a3 indicating that node 2 is in the link down state-got acknowledgment, node 1 enters the link up state. Node 1 transmits frame a4 indicating its link up state, but frame a4 is lost. Node 2, not having received an answer to frame a3 within a certain time, retransmits the contents of frame a3 as frame a5.

Node 1, upon receiving frame a5 retransmits the contents of frame a4 as frame a6. When node 2 receives frame a6, it enters the link up state and transmits this fact in frame a7 to node 1. When node 1 receives frame a7 indicating that node 2 is in the link up state, then node 1 is in a position to begin transmitting data.

Note that in the example of FIG. 2, node 2 spends some time in the link down-got ack state, while node 1 transitions through that state immediately to the link up state, upon receipt of frame a3.

Data Transfer and Message Management Protocols

As the nodes are establishing a link and emerging from the link down phase, several types of information are transferred between them which, according to the method of the invention, are used to coordinate which of the nodes will "drive the link", that is be responsible for retransmitting in case of a missed frame. According to the concept of the present invention, some of these are a part of a data transfer protocol header, while others are a part of a message management protocol header.

The data transfer protocol is embodied in control frames with, among other things, a header called a "herald". The herald is an indication to a receiving node that the transmitting node wishes to send data, and the herald announces the parameters of the data frames to be sent, including the number of frames, size of the frames, the data rate, and the interleaver interval setting. Another item in the data transfer protocol portion of the control frame is a herald acknowledgment, which is an indication that the receiving node is ready to receive the data that the heralding node wishes to send.

The message management protocol includes within its header several items of information important to the coordination of data transfer between nodes. One is the transmitting or source node address. In the idle state or a link down state-awaiting acknowledgment, a node will accept a link with any address. In any other state, the node will ignore control frames arriving from nodes other than the one with which it is linked up.

Another item in the message management header is the message identifier. This identifier distinguishes a particular message from other messages that might recently have flowed over a particular link.

Of particular importance to coordinating traffic between nodes, is the priority of a message, which is included in the message management header of the control frame.

Message management protocol information is first sent during establishment of a link, along with link establishment information. Then, it is sent when a new message is to be delivered or when a node has interrupted one of its own messages and later is preparing to resume it.

Control of Data Flow According to Priorities

FIG. 3 illustrates a typical process as two nodes emerge from the link down states. As can be seen in control frame b1, as node 1 is transmitting an indication of its link establishment state, it also sends a message management header with the information described above, including the priority of a message that node 1 has to send. Similarly, in control frame b2, node 2 includes with the indication of its link state, a message management header including the priority of any message it might have to send to node 1. Accordingly, once node 2 has received control frame b1 and node 1 has received control frame b2, each node knows the priority of a message to be sent by the other.

To determine which node transmits its message data first, the following rules are applied:

a. The node with the highest priority message will transmit first.

b. If the nodes have equal priority traffic, then the node that has the first opportunity, that is, the first node to go to the link up state, will transmit first.

On a half-duplex link, nodes having traffic of equal priority will take turns on the link. My process is optimized for half-duplex operation, but can take advantage of full duplex, if it is available.

For the example process of FIG. 3, it will be assumed that node 1, which initiated the link up, either has the only data to be transmitted, or that node 2 does not have data of higher priority to deliver to node 1. As a result, upon having received control frame b1, node 2 enters a receive state in which it is awaiting a herald from node 1. Then, as soon as node 1 has received the message management header of frame b2 and knows the priority of any messages of node 2, it is in a position to transmit frame b3, including a herald as a part of the data transfer header. The data transfer header is transmitted along with the indication that node 1 has made the transition to the link up state.

At this point, node 1 becomes the driver node, responsible for retransmitting, and node 2 is the driven node.

The receipt of the herald informs node 2 that node 1 does intend to send the data which both nodes know is of an appropriate priority. In addition, the herald contains detailed information about the series of data frames to be transmitted, including the number of frames, number of bytes and a frame and data rate, as previously mentioned. Node 2 then enters a receive state in which it is awaiting data. In frame b4, node 2 transmits, along with an indication that it is in the link up state, a data transfer header including a herald acknowledgment.

When node 1 receives the herald acknowledgment of frame b4, it knows that node 2 has received the herald and is ready to receive data. Node 1 then commences transmitting data as exemplified by frames b5 and b6.

FIG. 4 illustrates the situation in which node 1 initiates the link establishment, but node 2 has traffic of a higher priority to send. In addition, it is illustrated that some frames are lost.

When node 2 receives the message management header of frame c1 in FIG. 4, it receives the priority of any message that node 1 has to send and knows that the priority of its own message is higher. Accordingly, node 2 does not enter a state awaiting a herald as in the example of FIG. 3. Instead, node 2 intends to send a herald later in the link establishment process. Node 2 sends frame c2, with an indication that it is in the link down-got acknowledgment state and includes a message management header, conveying to node 1 the priority of the message that node 2 has to send.

At this point, node 1 can go to the link up state and, realizing that node 2 has a message of higher priority, awaits a herald.

Node 1 transmits frame c3 indicating its link up state, but the frame is not received by node 2. As a result, after a time, node 2 again transmits link down-got acknowledgment, in the same manner that it did in the process of FIG. 2. In the example of FIG. 4, frame c4 does not reach node 1. Node 1, knowing that node 2 will be the first to transmit data, simply waits. After a time-out, node 2 transmits frame c5, again with an indication of link down-got acknowledgment.

In response to frame c5, node 1 transmits link up again in frame c6. Upon receipt of frame c6, node 2 enters the link up state and is in a position to issue a herald to node 1 in frame c7, along with an indication of the link up state of node 2. Node 2 thus becomes the driver at this point and awaits a herald acknowledgment, which is forthcoming from the driven node 1 in frame c8. Upon receipt of the herald acknowledgment, node 2 begins to transmit the data frames of its message.

In the examples to follow, it will be assumed that the link is established, so the link establishment portions of the control frames will ordinarily not be shown.

Acknowledging the Data Frames of a Message

FIG. 5 illustrates the acknowledgment of data frames received, with some of the transmissions being lost. Frames d1 and d2 show the last part of a series of data frames transmitted from node 2 to node 1, with two data frames n−1 and n being shown. Data frame n−1 is not successfully received by node 1. When node 2 completes sending data frame n, it begins to await a data acknowledgment from node 1.

Node 1 knows how many frames are to be transmitted in a series from information in the herald it received from node 2 before the transmission of the series. Accordingly, after a time appropriate to the transmission of the known number of frames, node 1 transmits control frame d3 with a data transfer portion including a data acknowledgment. The data acknowledgment includes a bit map, with a bit corresponding to each transmitted frame indicating whether the frame was successfully received. Since any or all of the data frames might not be received at all, node 1 transmits the data acknowledgment after a particular delay, or after the receipt of the last data frame.

Just as node 1 sends its data acknowledgment at a selected time, node 2 knows that it should receive the data acknowledgment within a certain interval. When frame d3 is lost as indicated in FIG. 5, node 2 transmits frame d4 with a data transfer header including a data acknowledgment nack. The data acknowledgment nack informs node 1 that no data acknowledgment was received by node 2. As shown, node 1 receives frame d4 and therefore retransmits the data acknowledgment as frame d5.

When node 2 receives frame d5, it knows which data frames were received by node 1 and which data it needs to retransmit. At this point, node 2 has further data frames that it wishes to send to node 1, so it transmits frame d6 with a new herald.

In the example process of FIG. 5, node 1 has no data to send of a priority that would preempt the data that node 2 wants to send, so in response to the herald of d6, it transmits frame d7, including a herald acknowledgment to node 2. The herald acknowledgment, however, does not reach node 2, so after a time in which node 2 should have received the herald acknowledgment, node 2 retransmits its herald as frame d8.

Once node 1 receives the herald of frame d8, it retransmits its herald acknowledgment as frame d9. Upon receiving the herald acknowledgment of frame d9, node 2 begins transmitting data. It is assumed in the example of FIG. 5, that only frame n−1 of the previous series was lost, so this data frame is shown as being transmitted before beginning frames of the new series.

Driving the Link

As has been seen in the examples, once nodes achieve the link up state, a relationship is established between them that makes only one of them at a time, the "driver", responsible for retransmitting. The other node, the "driven" node, will simply respond to whatever frames it receives. This relationship allows the retransmission timeouts to be tight and efficient and helps ensure that both nodes will not attempt to transmit at the same time. The rule establishing the driver and driven nodes is as follows:

During the link up phase, a node drives the link from the point that it sends a herald which is acknowledged (retransmitting if it does not receive a herald acknowledgment), through the series of data frames, to the point that it receives the data acknowledgment (sending a data acknowledgment nack, if the driver fails to receive a data acknowledgment).

Turning the Link Around

The process of FIG. 6 illustrates turning the link around when traffic is flowing in both directions. The first two frames are the last data frames of a series of frames being transmitted by node 1 to node 2. The remaining frames illustrate a process which would occur, if node 2 had data to send to node 1 of priority equal to or greater than any remaining data that node 1 had to send. Thus, node 2 sends its data acknowledgment of the data received from node 1, along with a herald, and a message management header (not shown) if one has not been sent previously.

Upon receipt of control frame e3, node 1 recognizes from priority information that node 2 should be the one to transmit its data next. Accordingly, node 1 transmits control frame e4 with a data transfer header including a herald acknowledgment, and enters a receive state awaiting data. Node 2 does not receive frame e4, so it retransmits the information of frame e3 in frame e5. Node 1 responds by retransmitting the information of frame e4 in frame e6, which node 2 receives this time. In frames e7 and e8, node 2 begins transmitting the data frames of its message.

In the process of FIG. 7, the link is not turned around, because of the priorities. Node 2 is shown as sending the last frames f1 and f2 of a series. Then node 1 transmits a data transfer header including both a data acknowledgment of the data received from node 2, a herald, and a message management header.

Node 2 can tell from the message management header of frame f3 that it has data to send of priority greater than that of node 1. Accordingly, node 2 sends control frame f4 with a data transfer header including a herald, along with a message management header including the priority of the node 2 data. When node 1 receives frame f4, it recognizes that node 2 should be the next one to send its data. Therefore node 1 sends frame f5 acknowledging the herald of node 2 and awaiting data. Node 2 begins transmitting data in frames f6 and f7.

Message Preemption

If nodes are in the middle of transferring either a single message or two messages of equal priority and another message of higher priority arrives to be to be transmitted between them, this message should preempt any other lower priority messages at the earliest possible opportunity. If the message arrives at the node which is currently receiving, the earliest opportunity is at the end of the current series of data frames. At that point, the receiving node can start sending the higher priority message as illustrated in FIG. 8.

In frame g1 of FIG. 8, there is illustrated the transmission of the last of the current series of data frames of a first message from node 1 to node 2. As soon as this series of frames is complete, node 2 transmits a data transfer header including an acknowledgment of the received data and a herald for a second, higher priority message that node 2 now needs to send. In addition, frame g2 includes a message management header containing among other things the priority of the second message.

When node 1 receives frame g2, it recognizes the priority of the message that node 2 needs to send, so node 1 sends frame g3 with a herald acknowledgment. Frames g4 and g5 illustrate the transmission of the second, higher priority message from node 2 to node 1.

When node 1 receives frame g5 with the final data of the second message, it then sends along frame g6 with a data acknowledgment, a herald for the remainder of the first message. Node 2 receives the herald of frame g6 and transmits frame g7 with a herald acknowledgment. Upon receipt of the herald acknowledgment in frame g7, node 1 can begin sending the remainder of the first message in frame g8.

If the higher priority message arrives at the node which is currently transmitting, the easiest thing for the transmitter node to do is to wait until it finishes sending the current series of data frames and then assert its desire to send a higher priority message in place of the rest of the data frames of the first message. Alternatively, the transmitting node can interrupt a first message with a second, higher priority message, even though the current series of data frames has not been completed.

Flow Control

A node can temporarily prevent data from being transmitted to it be using a "null acknowledgment" indication as illustrated in FIG. 9. There, node 1 finishes a data transmission series in frame h1 and receives a data acknowledgment from node 2 in frame h2. Node 1 attempts to arrange the transmission of further data by sending a herald to node 2 in frame h3. However, node 2, rather than returning a herald acknowledgment, sends a null acknowledgment in frame h4. This prevents node 1 from sending its data to node 2, thereby giving node 2 control of the flow of data from node 1.

As illustrated by frames h5 and h6, the exchange of herald and null acknowledgment can continue for a number of times, until node 2 decides to receive data from node 1 and returns a herald acknowledgment in frame h8. Then node 1 can begin sending data, as illustrated in frame h9.

Dropping and Maintaining the Link

FIG. 10 illustrates how the nodes know that there are no more messages to transfer. In that figure, node 1 knows that it has no more messages, and it also knows that node 2 has none, since the data acknowledgment in frame k3 does not have with it a herald, so node 1 drops the link. Node 2 knows that it does not have a message to send, and when it does not receive a herald or, within a short time, a data acknowledgment nack, it assumes that node 1 has no more messages and drops the link. Alternatively, either node may send the other a link establishment frame with an indication to drop the link.

There are cases where the nodes will want to maintain the link, even when no data is present for periods of time. One application is a multi-hop subnetwork, where the network layer protocol sets up a circuit with multiple data links, before actually sending any data. The process of the present invention provides a "circuit" mode indication within the link establishment header that tells the nodes to send control frames, until both ends determine that they want to drop the circuit. In a typical exchange, the nodes would send back and forth a link up indication, a circuit mode indication and a data transfer header with a null acknowledgment, until it was time to drop the link.

Format of Control and Data Frames

A preferred embodiment of control frames for the present process is illustrated in FIG. 11.

The link establishment protocol header is formed of fields r5–r8. The indication of the link establishment state is conveyed by two bits in field r5.

The data transfer protocol header is comprised of fields r9–r16. The acknowledgment indications such as the data acknowledgment are conveyed by two bits in field r9. The acknowledgment bit map in field r10 contains a bit corresponding to each of the transmitted data frames, indicating whether the particular frame was received free of errors.

The herald is embodied in fields r11–r16. The number of frames to be transmitted is sent in field r11. The number of data bytes to be in each frame is in field r12. Data rate information is contained in fields r14 and r15.

The message management protocol header comprises fields r17–r24. Of particular note to the preceding discussion is field r23 indicating the priority of a message to be transmitted.

With the control frame structure of FIG. 11, the control frame transmitted between nodes can be of four different sizes. The smallest frame would include fields r1–r9, that is, extending through the ack nack field. The next largest frame would extend from field r1 through field r16, through the data transfer header. The next largest frame, comprised of fields r1–r24 would additionally include the message management header. The largest frame would include all of the fields, r1–r26. The frame cyclical redundancy check (CRC), field r27, is included in all cases.

It will be apparent to those skilled in the art that there are a number of alternative ways that the protocols employed in the method of the present invention may be embodied in control frames.

FIG. 12 illustrates an embodiment of a data frame in accordance with the invention. Field s5 contains the sequence number within the current series of data frames. This number is used by the data acknowledgment bit map. The message byte offset in field s6 identifies where this frame fits within the current message, so that the receiver will know how to reassemble the message. Field s8 contains the frames of message data being transmitted.

Operational Significance

In my invention, I have conceived that a suite of communication protocols of a specific structure can be used in a process to achieve communication which is very reliable and efficient by the standards of high frequency radio.

To understand what the invention accomplishes, it is a good starting point to consider the significance of the use of the herald acknowledgment. In a different arrangement, in which one node would simply announce that it was going to transmit data and then would send the data, significant problems would be introduced by the occasional failure of the data transmit announcement to reach the destination node.

For one thing, when the announcement was missed, the sending node could be embarked on a relatively long period of data transmission, while the unprepared destination node could be doing anything else besides receiving the transmitted data. The entire data transmission would be wasted.

Further, the use of the herald acknowledgment permits nodes to efficiently resolve which has the greater priority data and then to begin transmission of that data. This permits a lower priority message to be preempted in a timely manner and then resumed later.

In addition, transmission parameters such as data rate could not be made variable as they are in the present invention. If there were no assurance that variable parameters had been received before transmission began, then they could not be used and fixed values would be necessary. Accordingly, the communication system could not vary such parameters to respond to changing channel conditions.

Thus, the use of the herald acknowledgment is an important step. Moreover, it illustrates a generality associated with a system for managing high frequency radio communication; namely, there is always the question of what to do when a communication is not received by one of the nodes. This leads to questions as to what state the system may be in, what are the various scenarios that might occur, and what are the options for taking action? It is believed that the protocol structure and process of the invention constrain the number and variety of things that can happen when a communication is not received, creating simplified, predictable states and a simple set of responses. A communication system based on the invention can be planned so that there is no confusion and the system takes certain straightforward and efficient actions to correct for a missed communication, not wasting significant time in unproductive activity. It is believed that this is one of the significant contributions of the method of the invention.

I claim:

1. A method of managing communication between two nodes, one as the initiating node and the other as the responding node, comprising:

transmitting, from the initiating node to the responding node, an indication that the initiating node is in a first link establishment state, referred to as the "link down state-awaiting acknowledgment";

upon receipt by the responding node of an indication that the initiating node is in the link down state-awaiting acknowledgment, transmitting, from the responding to the initiating node, an indication that the responding node is in a second link establishment state, referred to as the "link down state-got acknowledgment";

if the initiating node receives an indication that the responding node is in the link down state-got acknowledgment, then transmitting, from the initiating to the responding node, an indication that the initiating node is in a third link establishment state, referred to as the "link up state", and otherwise transmitting instead from the initiating node the indication of the link down state-awaiting acknowledgment again; and if the responding node receives an indication that the initiating node is in the link up state, then transmitting, from the responding to the initiating node an indication that the responding node is in the link up state, and otherwise retransmitting from the responding node the indication of the link down state-got acknowledgment, whereby the link is established when each node has entered the link up state.

2. The method of claim 1, including the additional steps of:

transmitting message management headers along with the indications of link states transmitted for link establishment between the initiating node and the responding node, said message management headers including a priority of any message that is to be sent; and establishing as a first present driver node, a first of the initiating and responding nodes which reaches the link up state and has a message to send of priority equal to or greater than that of any message of the other of the initiating and responding nodes, the other of the initiating and responding nodes becoming a first present driven node, the first present driver node transmitting data while first present driven node receives data.

3. A method of managing communication between two nodes including a first node and a second node, comprising:

transmitting message management headers between the two nodes, including the priority of any message that is to be sent;

transmitting from the first node an indication, referred to as a "herald", that the first node is ready to send message data;

upon receipt of the herald by the second node, if the message data of the first node has a priority greater than that of any message data which the second node has to send, or if the message data of the first node has a priority equal to the highest priority of any message data the second node has stored, then establishing the first node as a driver node and the second node as a driven node, and transmitting, from the driven node to the driver, an indication, referred to as a "herald acknowledgment", that the driven node is ready to receive the message data of the driver node; and transmitting the herald from the first node to the second node again, if the first node does not receive the herald acknowledgment, but if the first node does receive the herald acknowledgment, then transmitting data of a first message from the first node to the second node.

4. The method of claim 3, additionally comprising the steps of:

if the second node has finished receiving a series of data of the first message and has a second message to send of priority equal to or greater than that of the first message, then transmitting a herald from the second node to the first node; and transmitting a herald acknowledgment from the first node to the second node, conditional on the priority of the second message compared to priorities of any messages that the first node has to send, whereby a link established between the first node and the second node is used to transmit data of the second message from the second node to the first node.

5. The method of claim 3, additionally comprising the steps of:

upon the second node having a second message to send of priority greater than that of the first message, before completion of transmission of the first message, then transmitting from the second node to the first node, along with a data acknowledgment, a herald and a message management header including the priority of the second message;

transmitting a herald acknowledgment from the first node to the second node, conditional on the priority of the second message compared to priorities of any messages that the first node has to send;

upon transmission of the herald acknowledgment, establishing the second node as the new driver, and the first node as the new driven node; and upon transmission and receipt of the second message, transmitting from the first node to the second node, along with a data acknowledgment, a new herald for an untransmitted portion of the first message, thereby permitting interruption of transmission of the first message by the second message and resumption of transmission of the first message.

6. The method of claim 3, additionally comprising the steps of:

upon the first node having a second message to send of priority greater than that of the first message, before the completion of transmission of the first message, then transmitting from the first node to the second node, following a data acknowledgment from the second node, a herald and a message management header including the priority of the second message;

transmitting a herald acknowledgment from the second node to the first node, conditional on the priority of the second message compared to priorities of any messages that the second node has to send;

transmitting data of the second message from the first node to the second node; and transmitting from the first node to the second node, a new herald for an untransmitted portion of the first message, thereby permitting interruption of transmission of the first message by the second message and resumption of transmission of the first message.

7. The method of claim 3, wherein the herald includes the size of data frames in the data to be sent by the first node, whereby receipt of the herald provides the second node with information necessary to respond to data frames of a size selected by the first node, and receipt of the herald acknowledgment informs the first node that the second node is prepared to receive data frames of the selected size, data frame size data being transmitted by the first node prior to transmission of each new series of data frames.

8. The method of claim 3, wherein the herald includes a data rate to be used for the data which is to be sent by the first node, whereby receipt of the herald provides the second node with information necessary to respond to data sent at a data rate selected by the first node, and receipt of the herald acknowledgment informs the first node that the second node is prepared to receive data at the selected rate, data rate information being transmitted by the first node prior to transmission of each new series of data frames.

9. The method of claim 3, wherein the herald includes a number of data frames to be included in the data which is to be sent by the first node, whereby receipt of the herald provides the second node with information necessary to respond to data having a number of data frames selected by the first node and receipt of the herald acknowledgment informs the first node that the second node is prepared to receive the selected number of data frames, wherein the number of data frames is transmitted by the first node prior to transmission of each new series of data frames.

10. A method of managing data transfer between two nodes including a driver node and a driven node, comprising:

transmitting data transfer headers between the two nodes, including an indication of a number of frames of data to be sent;

transmitting data of a message as frames of data from the driver node to the driven node;

receiving at the driven node as much of the transmitted data as possible and, after a time dependent on the number of frames of data included in the data transfer headers, transmitting from the driven node to the driver node an indication, referred to as a "data acknowledgment", of those portions of the data of the message correctly received;

if the driver does not receive the data acknowledgment, transmitting, from the driver node to the driven node, an indication, referred to as a "data acknowledgment nack", that the data acknowledgment was not received; and if the driven node receives a data acknowledgment nack, then again transmitting a data acknowledgment from the driven node.

11. The method of claim 10, further including the step of:

upon the driver node receiving a data acknowledgment indicating specific portions of the data of the message not correctly received, then retransmitting the specific portions of the data of the message not correctly received from the driver node to the driven node.

12. A method of managing communication between two radio nodes, comprising:

managing establishment of a link between the two nodes, one of the two nodes as an initiating node and the other of the two nodes as a responding node, by:

transmitting, from the initiating node to the responding node, an indication that the initiating node is in a first link establishment state, referred to as the "link down state-awaiting acknowledgment";

upon receipt by the responding node of an indication that the initiating node is in the link down state-awaiting acknowledgment, transmitting, from the responding node to the initiating node, an indication that the responding node is in a second link establishment state, referred to as the "link down state-got acknowledgment";

if the initiating node receives an indication that the responding node is in the link down state-got acknowledgment, then transmitting, from the initiating node to the responding node, an indication that the initiating node is in a third link establishment state, referred to as the "link up state", and otherwise retransmitting from the initiating node to the responding node the indication of the link down state-awaiting acknowledgment; and if the responding node receives an indication that the initiating node is in the link up state, then transmitting, from the responding node to the initiating node an indication that the responding node is in the link up state, and otherwise retransmitting from the responding node to the initiating node the indication of the link down state-got acknowledgment; and managing message and data transfer between the nodes, by:

transmitting message management headers along with the indications of link states transmitted for link establishment, said message management headers including an indication of priorities of any message that is to be sent;

establishing as a first present driver node, a first of the two nodes which reaches the link up state and has a message to send of priority equal to or greater than that of any message of the other of the two nodes, which becomes a first present driven node;

upon the first present driver node entering the link up state, transmitting, from the first present driver node to the first present driven node, along with the indication of the link up state, an indication, referred to as a "herald", that the first present driver node is ready to send its message data, said herald including an indication of a number of frames of data to be sent;

upon receipt of the herald by the first present driven node, transmitting, from the first present driven node to the first present driver node, along with an indication of link establishment state, an indication, referred to as a "herald acknowledgment", that the first present driven node is ready to receive the message data from the first present driver node;

if the first present driver node does not receive the herald acknowledgment, then again transmitting the herald from the first present driver node to the first present driven node, but if the first present driver node does receive the herald acknowledgment, then transmitting data of a first message from the first present driver node to the first present driven node;

receiving at the first present driven node as much of the transmitted data as possible and, after a time dependent on the number of data frames an indication of which was included in the herald, transmitting from the first present driven node to the first present driver node an indication, referred to as a "data acknowledgment", of those portions of the message data correctly received;

if the first present driver node does not receive the data acknowledgment, transmitting, from the first present driver node to the first present driven node, an indication, referred to as a "data acknowledgment nack", that the data acknowledgment was not received; and if the first present driven node receives a data acknowledgment nack, then again transmitting a data acknowledgment from the first present driven node.

13. A method of managing communication between two nodes including a first node and a second node, comprising:

transmitting message management headers between the two nodes, including the priority of any message that is to be sent;

transmitting from the first node an indication, referred to as a "herald", that the first node is ready to send message data;

upon receipt of the herald by the second node, if the message data of the first node has a priority greater than that of any message data which the second node has to send, or if the message data of the first node has a priority equal to the highest priority of any message data the second node has stored, then establishing the first node as a driver node and the second node as a driven node, and transmitting, from the driven node to the driver node, an indication, referred to as a "herald acknowledgment", that the driven node is ready to receive the message data of the driver node;

transmitting the herald from the first node to the second node again, if the first node does not receive the herald acknowledgment, but if the first node does receive the herald acknowledgment, then transmitting data of a first message from the first node to the second node;

if the second node has finished receiving a series of data of the first message and has a second message to send of priority equal to or greater than that of the first message, then transmitting a herald from the second node to the first node; and transmitting a herald acknowledgment from the first node to the second node, conditional on the priority of the second message compared to priorities of any messages that the first node has to send, whereby a link established between the first node and the second node is used to transmit data of the second message from the second node to the first node.

14. A method of managing communication between two nodes including a first node and a second node, comprising:

transmitting message management headers between the two nodes, including the priority of any message that is to be sent;

transmitting from the first node an indication, referred to as a "herald", that the first node is ready to send message data;

upon receipt of the herald by the second node, if the message data of the first node has a priority greater than that of any message data which the second node has to send, or if the message data of the first node has a priority equal to the highest priority of any message data the second node has stored, then establishing the first node as a driver node and the second node as a driven node, and transmitting, from the driven node to the driver node, an indication, referred to as a "herald acknowledgment", that the driven node is ready to receive the message data of the driver node;

transmitting the herald from the first node to the second node again, if the first node does not receive the herald acknowledgment, but if the first node does receive the herald acknowledgment, then transmitting data of a first message from the first node to the second node;

upon the second node having a second message to send of priority greater than that of the first message, before completion of transmission of the first message, then transmitting from the second node to the first node, along with a data acknowledgment, a herald and a message management header including the priority of the second message;

transmitting a herald acknowledgment from the first node to the second node, conditional on the priority of the second message compared to priorities of any messages that the first node has to send;

upon transmission of the herald acknowledgment, establishing the second node as the new driver, and the first node as the new driven node;

transmitting data of the second message from the second node to the first node; and transmitting from the first node to the second node, along with a data acknowledgment, a new herald for an untransmitted portion of the first message, thereby permitting interruption of transmission of the first message by the second message and resumption of transmission of the first message.

15. A method of managing communication between two nodes including a first node and a second node, comprising:

transmitting message management headers between the two nodes, including the priority of any message that is to be sent;

transmitting from the first node an indication, referred to as a "herald", that the first node is ready to send message data;

upon receipt of the herald by the second node, if the message data of the first node has a priority greater than that of any message data which the second node has to send, or if the message data of the first node has a priority equal to the highest priority of any message data the second node has stored, then establishing the first node as a driver node and the second node as a driven node, and transmitting, from the driven node to the driver node, an indication, referred to as a "herald acknowledgment", that the driven node is ready to receive the message data of the driver node;

transmitting the herald from the first node to the second node again, if the first node does not receive the herald acknowledgment, but if the first node does receive the herald acknowledgment, then transmitting data of a first message from the first node to the second node;

upon the first node having a second message to send of priority greater than that of the first message, before the completion of transmission of the first message, then transmitting from the first node to the second node, following a data acknowledgment from the second node, a herald and a message management header including the priority of the second message;

transmitting a herald acknowledgment from the second node to the first node, conditional on the priority of the second message compared to priorities of any messages that the second node has to send;

transmitting data of the second message from the first node to the second node; and transmitting from the first node to the second node, a new herald for an untransmitted portion of the first message, thereby permitting interruption of transmission of the first message by the second message and resumption of transmission of the first message.

\* \* \* \* \*